W. R. MITTENDORF.
COMPUTING SCALE.
APPLICATION FILED DEC. 16, 1907.
916,754.
Patented Mar. 30, 1909.
2 SHEETS—SHEET 2.
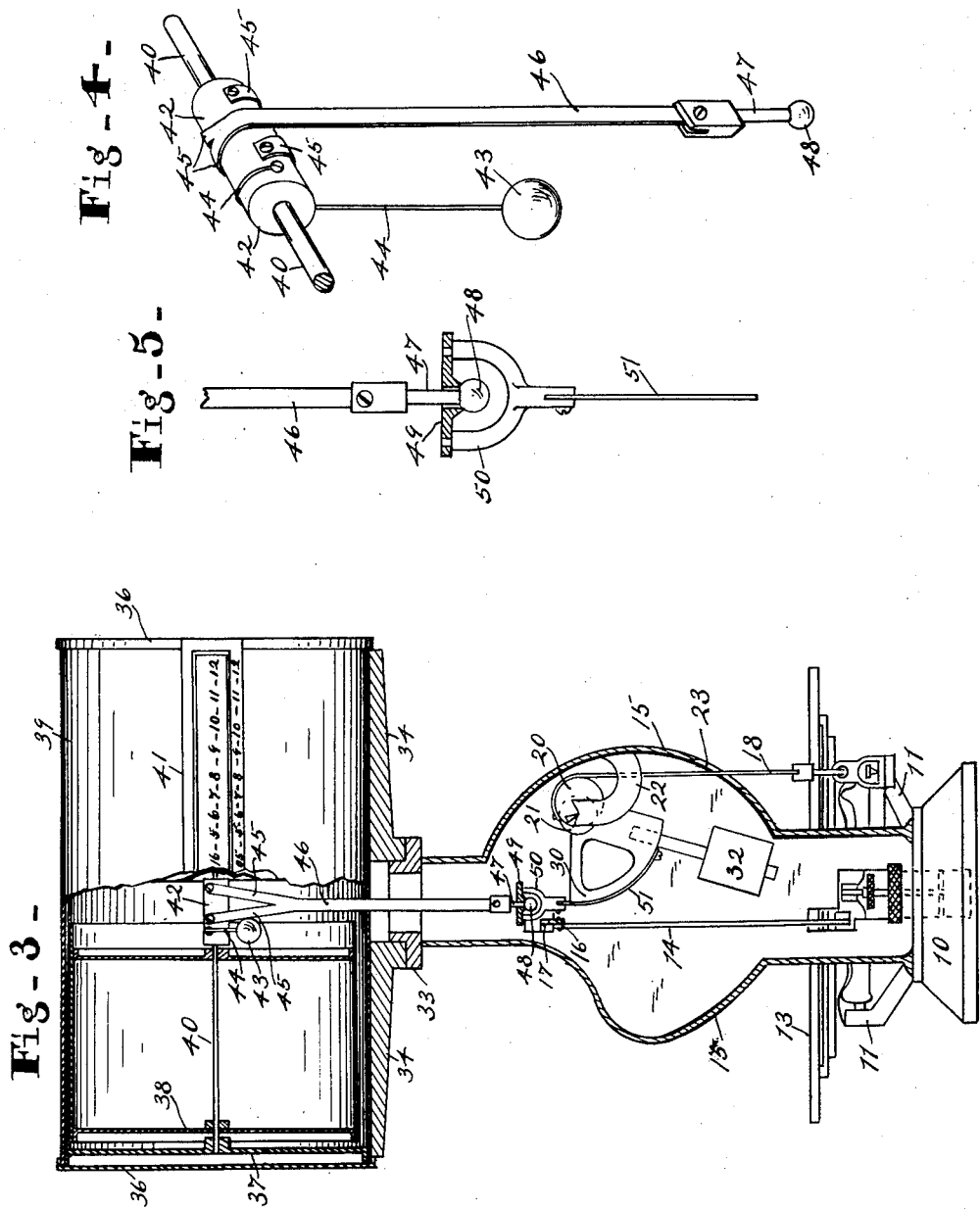
WITNESSES:
INVENTOR.
William R. Mittendorf
BY
ATTORNEY.

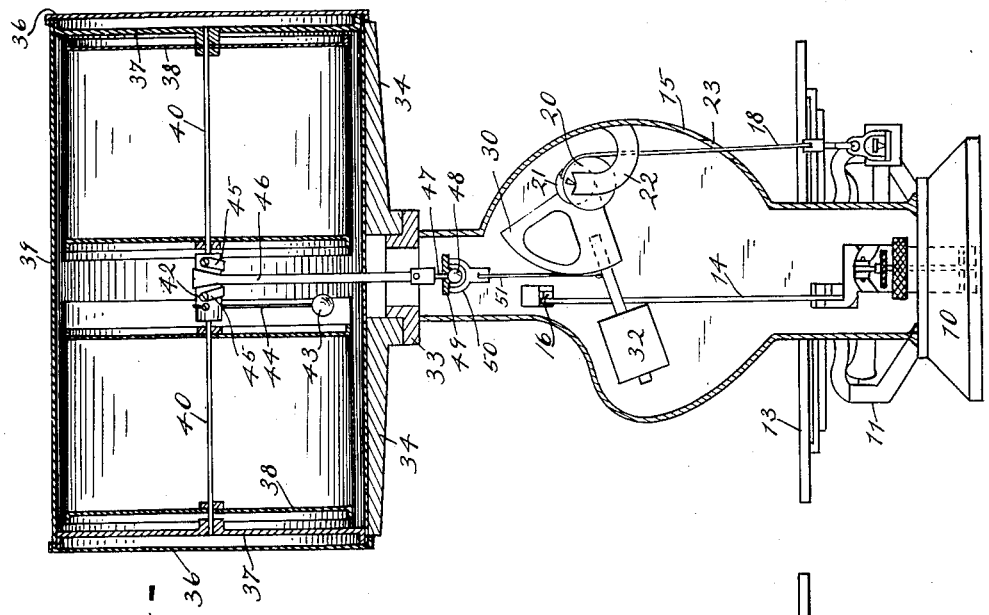

UNITED STATES PATENT OFFICE.

WILLIAM R. MITTENDORF, OF ANDERSON, INDIANA, ASSIGNOR TO THE ANDERSON TOOL COMPANY, OF ANDERSON, INDIANA, A CORPORATION OF INDIANA.

COMPUTING-SCALE.

No. 916,754.  Specification of Letters Patent.  Patented March 30, 1909.

Application filed December 16, 1907. Serial No. 406,635.

*To all whom it may concern:*

Be it known that I, WILLIAM R. MITTENDORF, of Anderson, county of Madison, and State of Indiana, have invented a certain new and useful Computing-Scale; and I do hereby declare that the following is a full, clear, and exact description thereof, reference being had to the accompanying drawings, in which like numerals refer to like parts.

The object of this invention is to improve the construction and operation of computing scales, and especially those of the drum type or which have revoluble means for indicating the effect of an applied load and which are wholly automatic.

One feature of this invention is to provide a construction that enables the operator to readily oscillate the drum horizontally to make it face him in any position and yet the operation of the device in no manner be affected by such horizontal oscillation of the drum. Along with the foregoing is the idea of a swivel connection between the drum and the means controlled by the weighing lever, which permits the horizontal oscillation of the drum.

In drum scales heretofore it has been difficult to make a uniformly accurate scale because of the difficulty in the action of the weighing lever to cause an entire revolution of the drum on which the graduation is located. It has been necessary in practice heretofore to use springs or other means for multiplying the power employed to rotate the drum, to cause an entire revolution thereof, but the action upon such means of the variations in temperature has rendered its operation ununiform and inaccurate. It has been sought to overcome this difficulty by the addition of thermostats and the like. This, however, makes a complicated structure.

One object of my present invention is to remedy the difficulty referred to by simple mechanical means, not influenced by changes in temperature. One feature contributing to the accomplishment of this result is the provision of a flexible means for transmitting power from the weighing lever to the drum shaft which means has a split end at its connection with the drum shaft so that the end or ends of said connecting means secured on the drum shaft will in no manner interfere with said connecting means as it winds and unwinds on the drum shaft. Along with the foregoing is the provision of a weight acting on the drum shaft that moves in a direction opposite to that of the applied load when put on the platform or load receiving member, for holding taut the means connecting the drum shaft with the means controlled by the weighing lever, whereby said weight will act in opposition to the effect of the applied load in the revolution of the drum. There is also combined with the foregoing means a counter-weight normally in a raised position that also travels in the direction of the load receiving member under an applied load and in opposition to the weight of the drum shaft. These and the various other features of my invention will be understood from the accompanying drawings the following description and claims.

In the drawings Figure 1 is a side elevation of the device with the internal parts indicated by dotted lines. Fig. 2 is a central transverse section through the vertical portion of the scale showing the parts in their idle positions. Fig. 3 is the same as Fig. 2 with the parts in their actuated positions. Fig. 4 is a perspective view of the middle portion of the drum shaft with the weight and flexible connection thereon. Fig. 5 is a vertical section showing the swivel connection between the strip on the drum shaft and the means controlled by the lever.

In detail the drawings show a base 10 with bearing 11 for the weighing lever 12 which at one end carries the platform or load receiving member 13. There is means for maintaining the horizontal position of the platform which consists of the stem 14 secured thereto and which projects into the casing 15 and turns upward and at its upper end is pivoted to the bar 16 that is fulcrumed at 17. The weighing lever 12 projects toward the casing 15 and the flexible connection or strip 18 extends vertically from the eccentric disk 20 on the shaft 21 that is mounted in the casing on the arms 22 through the opening 23 down to the weighing lever 12. Said weighing lever also has a weight 24 for normally balancing the load receiving member. A segment 30 is rigidly secured to the shaft 21 and to it a normally raised weight 32 is connected. The upper end of the casing 15 is cylindrical and has a bearing collar 33 on which the base of the drum frame 34 is revolubly mounted, as shown in Fig. 2. The drum frame consists in addition to said base of the ends 36 and the bearing plates 37 for the drums 38 and a cylindrical cover or casing 39 for the drums. I provide two drums separate from each other and both secured on one continuous shaft 40 mounted in the plates 37. Upon said drums numerals indicating weights and total values are disclosed through the slots 41 in the casing and upon the case prices per pound are placed. Between the drums there is a cylinder 42 secured to the shaft 41 so as to form practically a part of said shaft. To said cylinder I hang the weight 43 by a cord 44 that tends to turn the drums in one direction. To said cylinder 42 I secure the split ends 45 of the flexible connection or strip 46 that when drawn tends to revolve the drums in a direction opposite to the action of the weight 43. To the lower end of the flexible strip 46, see Fig. 5, there is secured a rod 47 having a ball 48 on its lower end, said rod extending through the central opening in the swivel plate 49 on the upper end of the frame 50 that is secured to the flexible strip 51, which at its lower end is fastened to the lower segmental surface of the segment 30.

The operation of the scale is as follows. The parts in their unoperated position are as shown in Fig. 2, the flexible connection 46 being wound on the shaft of the drum and the weight cord 44 being relatively unwound. The weight 43 therefore acts against the weight 32 and holds it in a normally-raised position and permits the inner end of the weighing lever 12 to move downward and to hold the platform 13 elevated normally. When the load is placed upon the platform 13, it elevates the inner end of the lever 12, relaxes the connection 18 with said lever, and thus permits the weight 32 to move downwardly in the same direction as the platform moves and through the flexible connection formed by the strips 51 and 46 to revolve the drums against the action of the weight 43. The diminishing effect of the weight 32 as it moves downwardly toward its center of gravity is counter-balanced by the eccentric 20 which correspondingly throws the tangential point of the strip 18 on said eccentric farther away from the axis thereof. When the load is removed the weight 43 returns the parts to their normal position. This construction permits the horizontal oscillation of the drum on the bearing collar 33 to make the reading side of the drum face the operator as desired and by reason of the swivel construction and the flexible connection between the drum shaft and the lower part of the device such oscillation of the drums will have no effect upon the action and accuracy of the scale.

The words "lapping" and "overlapping" are used herein to mean the same as "lapping upon", the idea being that the strip 46 as it coils on the cylinder 42 does not lap upon itself when the cylinder is turned to the limits provided for in the construction. That is, no portion of the strip 46 and split ends 45 engage or lie upon any other portion of said strip 46 or split ends 45 but miss and disengage each other in coiling.

What I claim as my invention and desire to secure by Letters Patent is:

1. A scale including a weighing lever, oscillatory means for indicating the effect thereon of an applied load, and a single flexible connection between them, partially bifurcated and separate at the end thereof which is secured to said indicating means, substantially as set forth.

2. A scale including a weighing lever, oscillatory means for indicating the effect thereon of an applied load, a shaft for oscillating the indicating means, and a flexible connection between the lever and said shaft that is normally coiled on the shaft so that when drawn downwardly it will actuate the drum, the end of said flexible connection being bifurcated and the ends of the bifurcated portions being spread laterally and secured to the shaft whereby no part of said flexible connection will lap upon and engage any other part thereof during the revoluble movement of the drum.

3. A scale including a weighing lever, an oscillatory indicating means, a weight, means controlled by said lever for holding the weight in a normally raised position when there is no load, a flexible connection between said weight and the indicating means for actuating the latter under the influence of the weight and an applied load, and a weight in connection with said indicating means which acts in opposition to said first mentioned weight to return the indicating means to its normal position and to maintain said first mentioned weight in a normally raised position.

4. A scale including a lever with one end weighted, a load-receiving member on the other end thereof that without a load does not counterbalance said weighted end, an oscillatory shaft, a connection between said shaft and the weighted end of said lever, whereby the latter will tend to return said shaft to its normal position, a counterweight mounted in connection with said shaft that is normally in a raised position and under the influence of a load moves in the same direction as the load-receiving member and actuates said shaft, an oscillatory indicating means, a connection between said shaft and said indicating means that actuate said indicating means, and a weight that tends to return said indicating means to normal and to hold the weight connected with said shaft in a normally raised position.

In witness whereof, I have hereunto affixed my signature in the presence of the witnesses herein named.

WILLIAM R. MITTENDORF.

Witnesses:
B. D. EMANUEL,
I. J. CUSHING.